(12) United States Patent
Alajbegovic

(10) Patent No.: US 9,435,220 B2
(45) Date of Patent: Sep. 6, 2016

(54) TURBOCHARGER CONTROL LINKAGE WITH REDUCED HEAT FLOW

(75) Inventor: Vahidin Alajbegovic, Arden, NC (US)

(73) Assignee: BorgWarner Inc., Auburn Hills, MI (US)

(*) Notice: Subject to any disclaimer, the term of this patent is extended or adjusted under 35 U.S.C. 154(b) by 996 days.

(21) Appl. No.: 13/520,252

(22) PCT Filed: Jan. 5, 2011

(86) PCT No.: PCT/US2011/020192
§ 371 (c)(1),
(2), (4) Date: Jul. 2, 2012

(87) PCT Pub. No.: WO2011/087939
PCT Pub. Date: Jul. 21, 2011

(65) Prior Publication Data
US 2013/0011243 A1    Jan. 10, 2013

Related U.S. Application Data

(60) Provisional application No. 61/295,715, filed on Jan. 16, 2010.

(51) Int. Cl.
*F02D 23/00* (2006.01)
*F01D 17/00* (2006.01)
*F01D 17/12* (2006.01)
(Continued)

(52) U.S. Cl.
CPC .............. *F01D 17/20* (2013.01); *F02B 37/24* (2013.01); *F02C 6/12* (2013.01); *F16C 7/00* (2013.01); *F05D 2260/22141* (2013.01); *F05D 2300/5024* (2013.01); *F16C 2202/24* (2013.01); *Y02T 10/144* (2013.01); *Y10T 29/49238* (2015.01)

(58) Field of Classification Search
CPC .... F02B 37/18; F02B 37/183; F02B 37/186; F02B 37/24; F01D 17/20; F02C 6/12; F16C 7/00; F16C 2202/24; Y02T 29/49238; Y02T 10/144; F05D 2260/22141; F05D 2300/5024; C22F 1/183; C22C 14/00
USPC ...... 60/602; 415/144, 177, 148; 29/888.021; 148/669, 421
See application file for complete search history.

(56) References Cited

U.S. PATENT DOCUMENTS 1,697,608 A * 1/1929 Patterson .............. F16K 27/062
137/338
3,011,522 A * 12/1961 Welsh .................. F16K 11/0853
137/625.46

(Continued)

FOREIGN PATENT DOCUMENTS

GB      1058237 A *  2/1967  ........... F01D 17/105
GB      1334736 A * 10/1973  ........... H02H 7/0833
WO  WO 2009015676 A1 * 2/2009  ............ F16H 25/20

*Primary Examiner* — Thai Ba Trieu
(74) *Attorney, Agent, or Firm* — A. Michael Tucker; Stephan A. Pendorf; Patent Central LLC

(57) ABSTRACT

The life of an actuator such as a turbocharger VTG actuator is extended by reducing heat conduction from the turbine housing along the control linkage to the actuator link and into the actuator, thereby protecting sensitive electronic components. To this end, the control linkage may be equipped with cooling fins, or be made hollow rather than solid, or be made of a thermal energy retarding material in order to retard heat from the turbine housing assembly reaching the actuator.

13 Claims, 11 Drawing Sheets

(51) Int. Cl.
*F01D 17/20* (2006.01)
*F02B 37/24* (2006.01)
*F02C 6/12* (2006.01)
*F16C 7/00* (2006.01)

(56) References Cited

U.S. PATENT DOCUMENTS

| | | | | |
|---|---|---|---|---|
| 3,262,295 A * | 7/1966 | Woloszynek | ......... | B21C 37/207 72/250 |
| 3,266,235 A * | 8/1966 | Carlson, Jr. | ........... | F16K 31/025 251/11 |
| 3,916,941 A * | 11/1975 | Usry | .................... | F16K 49/005 137/340 |
| 4,827,884 A * | 5/1989 | Cook | ...................... | F02D 9/102 123/336 |
| 5,069,076 A * | 12/1991 | Rosenthal | ............... | F16H 25/20 74/89.44 |
| H001191 H * | 6/1993 | Hutchison | ................. | F15B 9/03 91/361 |
| 5,366,570 A * | 11/1994 | Mazur | ..................... | C22F 1/183 148/421 |
| 5,491,372 A * | 2/1996 | Erhart | ....................... | H02K 7/06 310/80 |
| 5,624,505 A * | 4/1997 | Mazur | ..................... | C22F 1/183 148/421 |
| 6,360,541 B2 * | 3/2002 | Waszkiewicz | ........ | F02B 37/183 60/602 |
| 6,603,228 B1 * | 8/2003 | Sato | ......................... | H02K 7/06 310/12.32 |
| 6,925,803 B2 * | 8/2005 | Natali | .................. | F02B 37/186 60/602 |
| 6,976,359 B2 * | 12/2005 | Hastings | ............... | F02B 37/183 60/602 |
| 7,100,375 B2 * | 9/2006 | Baize | ...................... | F02D 23/00 60/602 |
| 7,481,056 B2 * | 1/2009 | Blaylock | ................. | F02D 23/00 60/602 |
| 7,603,859 B2 * | 10/2009 | Sterner | ................... | F02B 37/24 60/602 |
| 8,172,197 B2 * | 5/2012 | Gu | ........................... | F16K 7/17 251/129.17 |
| 8,585,012 B2 * | 11/2013 | Labataille | ............... | F16K 37/00 251/129.04 |
| 8,601,952 B2 * | 12/2013 | Tamai | ..................... | F16H 7/029 74/89.34 |
| 9,052,019 B2 * | 6/2015 | Ma | ......................... | F16K 5/0652 251/315.14 |
| 2001/0045783 A1 * | 11/2001 | Hagiike | .................. | F16H 1/32 310/75 R |
| 2008/0023661 A1 * | 1/2008 | Gu | ........................... | F16K 7/17 251/30.01 |
| 2009/0165581 A1 * | 7/2009 | Koyagi | ................ | F16H 25/2015 74/89.23 |
| 2010/0206103 A1 * | 8/2010 | Duits | ...................... | F16H 25/20 74/89.34 |
| 2011/0260083 A1 * | 10/2011 | Labataille | ............... | F16K 1/221 251/129.01 |
| 2012/0298902 A1 * | 11/2012 | Ma | ......................... | F16K 5/0652 251/315.03 |
| 2013/0112104 A1 * | 5/2013 | Tamai | .................... | F16H 57/029 74/89.34 |
| 2013/0139503 A1 * | 6/2013 | Eggler | ................. | F02M 25/077 123/568.11 |
| 2013/0340426 A1 * | 12/2013 | Bogner | ................. | F01D 17/105 60/602 |
| 2015/0004020 A1 * | 1/2015 | Lombard | ................. | F04D 25/04 417/406 |
| 2015/0114151 A1 * | 4/2015 | Hirai | ..................... | F16H 25/205 74/89.25 |
| 2015/0267605 A1 * | 9/2015 | Lombard | ............... | F02B 37/183 60/602 |

* cited by examiner

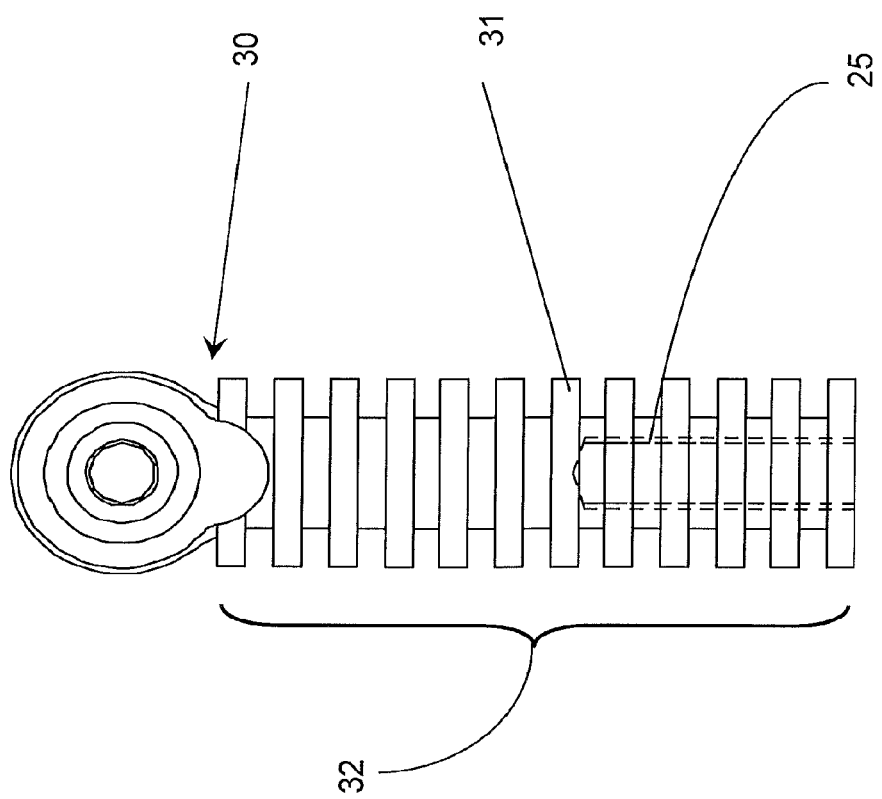

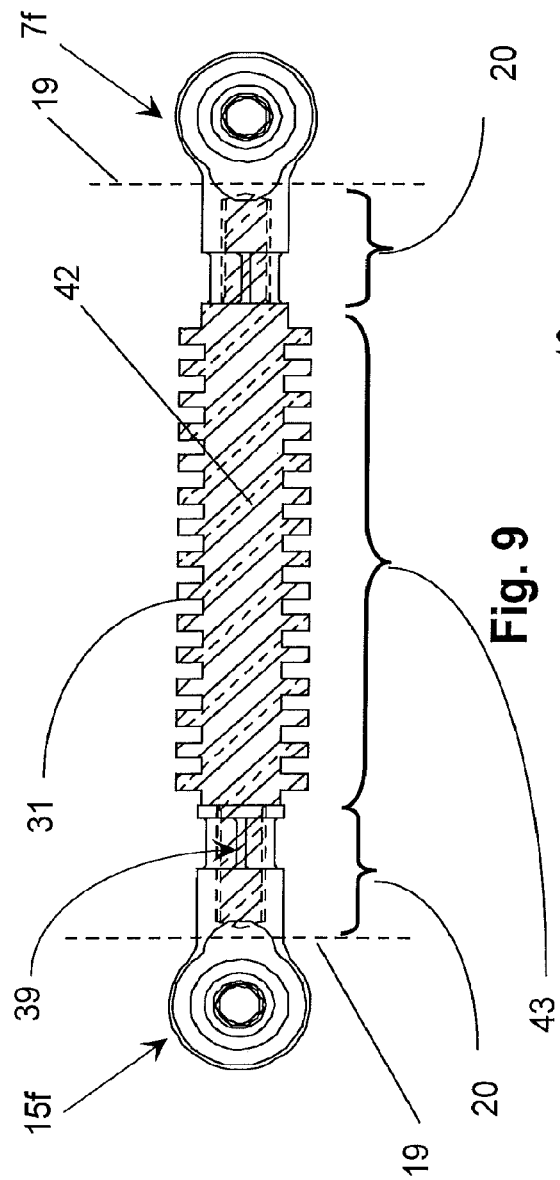
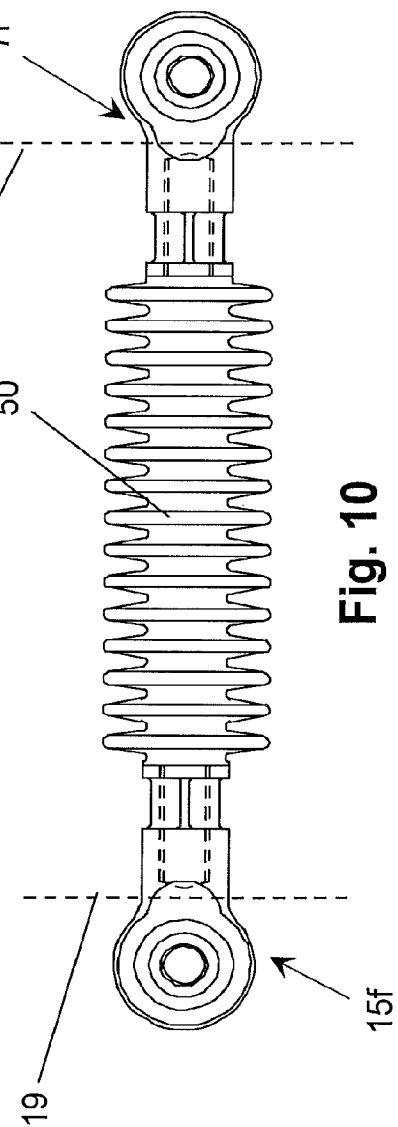

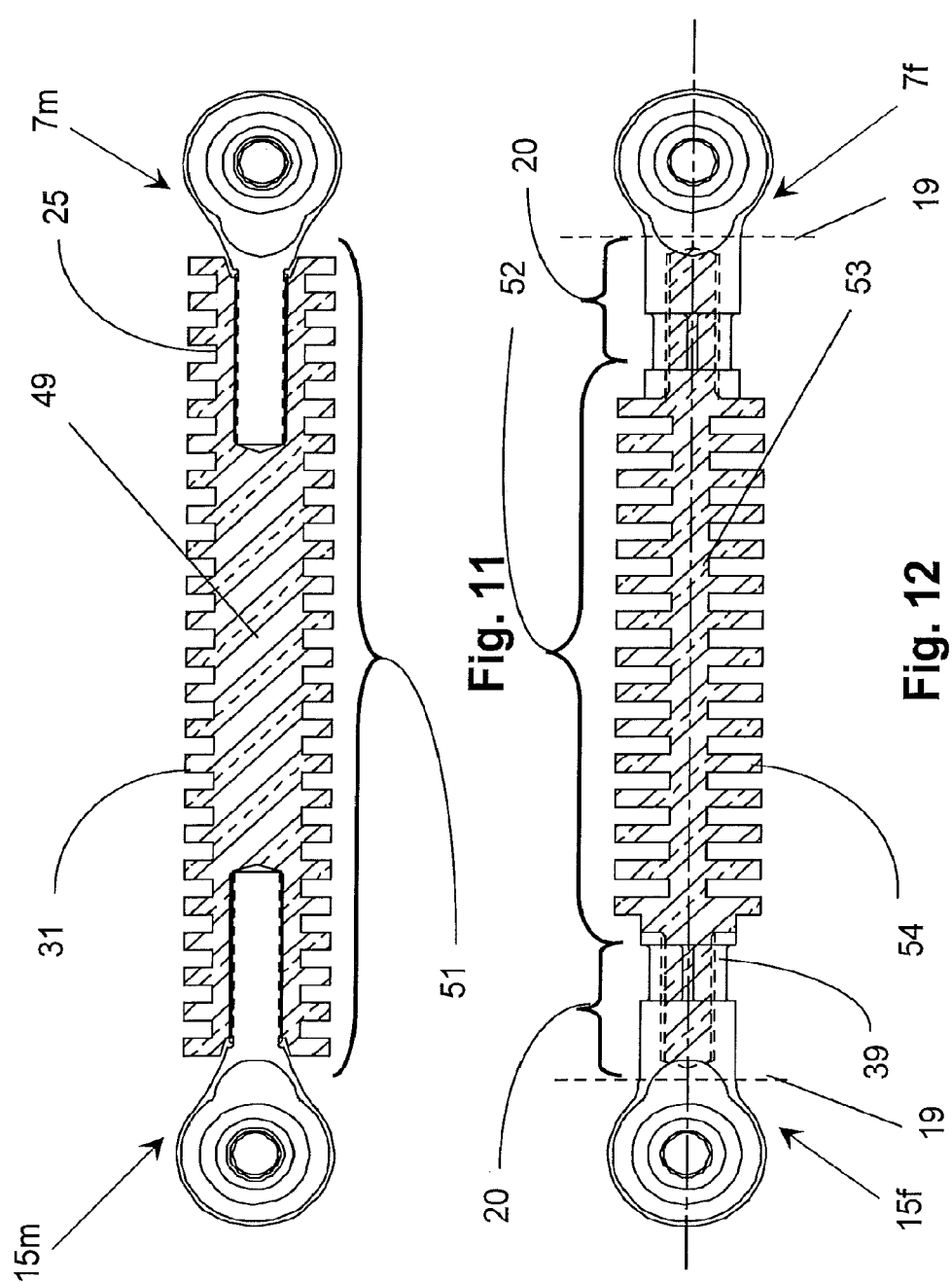

TURBOCHARGER CONTROL LINKAGE WITH REDUCED HEAT FLOW

FIELD OF THE INVENTION

The invention is directed to a Variable Turbine Geometry (VTG) turbocharger with an electric motor driven actuator, or a wastegated turbocharger, and in particular, the design of a wastegate or VTG electronic actuator unit.

BACKGROUND OF THE INVENTION

Turbochargers are a type of forced induction system for internal combustion engines which use the exhaust flow, entering the turbine housing from the engine exhaust manifold, to drive a turbine wheel, which is located in the turbine housing. To control the energy to the turbine wheel, and thus the boost output of the turbocharger, which, in turn, affects the power output of the engine, a variable geometry configuration of the turbine stage is used to control said turbine energy. In the case of a VTG, an actuator is used to control the turbine power.

While the highest exhaust temperature of a gasoline engine is up to 1050° C., the exhaust temperature of a large Diesel engine is typically up to 760° C. With increasing demands for improved emissions, engine combustion chamber temperatures not only run hotter, but aerodynamic demands, such as lower hood lines and lower engine compartment airflow, combine to produce an increasingly thermally hostile environment for engine components, internal and external.

With the requirement for ever tighter emissions, electronic controls have replaced more thermally accepting control-force mediums such as vacuum, hydraulic and air pressure. Electronics used in automotive applications are not particularly tolerant of temperatures above 100° C. Printed Circuit Boards (PCBs) have to be specially manufactured to even meet the 100° C. threshold. Of the components within a VTG actuator enclosure, gears, shafts, electric motors and sensors, the PCBs are the most intolerant of excess temperature.

On VTG or wastegate electronically controlled turbochargers, the actuator has to be located in close proximity to the turbocharger because the actuator mechanically controls valves or vanes in the turbine stage of the turbocharger. This close proximity is driven by the requirement of the article being driven (vanes or valves) and is exacerbated by the requirement for a tight envelope surrounding the engine.

Electronic components are often air or water-cooled to protect the thermally sensitive components. Sometimes they are mounted remotely such as on the cabin firewall or even under the front seats of the vehicle in the quest for a more thermally and vibration friendly environment. Turbocharger electronic actuators however must be mounted either on, or close to, the turbine housing. Sometimes the turbocharger itself incorporates a water-cooled bearing housing which lessens the electronic actuator ambient thermal issues. The electronic VTG actuator, which is associated with the subject of this invention, is typically mounted directly to the turbine housing so that the controls can be assembled, datumed, and validated at the factory where the turbocharger is assembled, to neutralize manufacturing variances.

A typical electronic actuator (10) is shown in FIGS. 1 and 2 mounted directly to a typical turbocharger housing (1) via a cast iron casting bracket (2) which is part of the turbine housing assembly. A signal from an engine controller unit (ECU) commands rotation of an actuator shaft (11) which rotates an actuator drive arm (12). Connected by a pin, bolt, or stud (14) to the actuator drive arm (12) is a linkage. The linkage, depicted in FIG. 6, typically has a shaft (16) mechanically attached to a pair of rod-ends which are free to rotate a few degrees about the control linkage centerline, but are constrained longitudinally. This arrangement ensures centerline forces on the shaft, which minimizes bending loads on the linkage. The pin, bolt or stud (14) is mechanically attached to a bore (9) in the ball (8). The ball (8) is constrained but free to rotate in the head (3) of the rod-end.

In FIG. 6, the driving rod-end (15f) (hereinafter "f" refers to female connector and "m" refers to male connector) is attached to the actuator end of the shaft (16), and the driven rod-end (7f) is attached to the VTG end of the shaft (16). The driven rod-end (7f) is connected by a pin, bolt or stud (6) to the driven arm (4) of the VTG. The driven arm is connected such that any rotation of the driven arm (4) is transferred to a shaft in the VTG upon which the driven arm is attached. All movement commanded by the engine ECU to the VTG actuator (10) results in movement of the driving arm, connecting linkage and driven arm to the shaft in the VTG, which moves the VTG vanes to control the exhaust flow to a turbine wheel.

The inventor discovered, while performing unrelated testing, that a Diesel engine, at the test condition, had an exhaust temperature of 650° C., which produced a turbine housing outer skin temperature in excess of 435° C. The VTG vanes are wetted by the exhaust flow so they see the exhaust temperature (which, for the engine being tested had a design a maximum of 760° C.) directly impinging on the surfaces of the vanes. Some heat energy is lost in conduction through the internal linkages to the VTG shaft. The VTG shaft is however mechanically connected to the VTG driven arm (4) with a large contact surface area such that thermal transference via conductance is, unfortunately, efficient. The tests showed that the driven rod end (7f) (VTG end rod-end) on the linkage had a temperature of 150° C. The rod-ends (15 and 7) and the shafts (16) are typically steel with a bronze or plastic bearing surface in the ball joint so that much of the heat from the VTG shaft is transferred by conductance via the drive pin (14) and actuator drive arm (12) to the actuator shaft (11). The tests indicated that a temperature of 150° C. at the VTG driven arm (4) resulted in a temperature of 121.5° C. at the actuator drive arm (12), with the standard linkage.

A failure in the electronics in the actuator is a failure of the turbocharger. To protect the sensitive electronics in the actuator (10), many methods are employed:

Some VTG installations have water cooled actuators, which is a relatively complex, potentially unreliable, and expensive solution.

Some VTG installations have water cooled bearing housings, which is a relatively common, albeit expensive solution, but which does improve the thermal conditions inside and around the turbo.

Some VTG installations have actuators cooled by forced air circulation and shielding, which is difficult to execute, and the shielding is difficult to maintain.

Some VTG installations have the actuator removed relatively far from the VTG and connected to the VTG via a long connecting rod. This causes problems in actuator shaft stiffness and damping VTG casting issues due to the length of the bracket design of the casting envelope, and, above all, moving the actuator away from the VTG is architecturally challenging.

A typical control linkage configuration is determined by the diameter of the drive pin (14), or bore in the ball joint, which typically is paired with a male (24), or female (25) thread in the barrel or neck of the rod-end. For example, the control linkage, depicted in FIG. 6 has a 6 mm drive pin (14) and a shaft (16) 6 mm in diameter. This can cause durability problems because, while the rod end itself is capable of transmitting static centerline loads, the control linkage shaft can bend, or vibrate in resonance with an excitation from the engine. Either of these problems can cause premature wear-out of the ball joints in the rod end.

So it is clear that there is a need for a cost-effective solution for retarding heat energy transfer from the turbine housing through the control linkage to the actuator in such a manner that it does not compromise the design and durability of the engine or components. It would be desirable to cure at the same time the problem of control linkage shaft bending or vibration.

SUMMARY OF THE INVENTION

The present invention is based on the surprising discovery that a useful degree of protection can be provided to the electronic components of a VTG or wastegate actuator by providing means to retard heat energy transfer along the control linkage connecting the actuator to the VTG mechanism or wastegate. Once the inventor realized the concept of the invention, several alternative means to accomplish the concept of retarding heat energy transfer became apparent. For example, a plurality of cooling fins could be provided along at least one axial segment of the control linkage connecting the electronic actuator to the VTG. The cooling fins may extend radially outwardly, e.g., may be axially spaced, generally annular, cooling fins extending generally perpendicular to the axis of the control linkage, or the cooling fins may extend axially, parallel to the axis of the control linkage, arranged generally symmetrically, and spaced circumferentially, whereby the effective surface of the control linkage is increased. The cooling fins radiate heat and reduce heat transfer to the electronic actuator. It is surprising that a useful degree of radiative cooling is achieved, given the elevated temperature of the ambient environment around the turbocharger and the limited length of the control linkage.

The provision of cooling fins not only affords a much more cost-effective solution to the problem of protection of electronic components from excess thermal energy, it provides additional benefits. For example, as mentioned above, the shaft can bend, or vibrate in resonance with an excitation from the engine, either of these causing premature wear-out of the ball joints in the rod end. The cooling fins, particularly axially extending fins, increase control linkage shaft stiffness and reduce vibration, thus minimizing or eliminating vibration.

Finally, compared to the complexity of water cooling or other temperature control measures, the present invention provides a simple, assembly-foolproof, low cost solution to minimize the heat flow from the turbine housing assembly to the actuator, while increasing the robustness of the assembly.

BRIEF DESCRIPTION OF THE DRAWINGS

The present invention is illustrated by way of example and not by limitation in the accompanying drawings, in which like reference numbers indicate similar parts and in which:

FIG. 5 depicts a view of a first embodiment of a rod end according to the invention;

FIG. 9 depicts a view of a third embodiment of a control linkage according to the invention;

FIG. 10 depicts a view of a first variation to a third embodiment of a control linkage according to the invention;

FIG. 11 depicts a view of a second variation to the third embodiment of a control linkage according to the invention;

FIG. 12 depicts a view of a third variation to the third embodiment of a control linkage according to the invention.

DETAILED DESCRIPTION OF THE INVENTION

Figure 1:
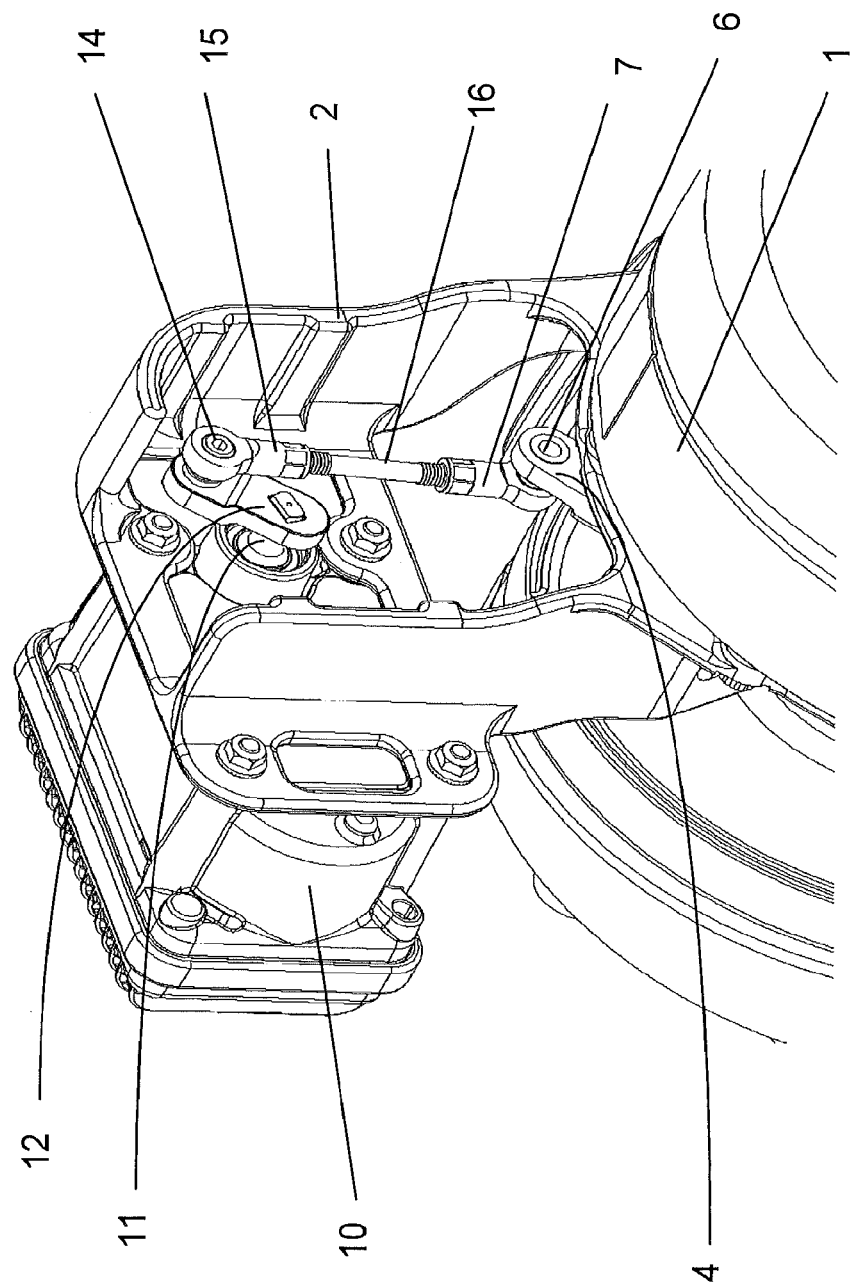
FIG. 1 depicts a turbine housing mounted actuator assembly from the turbine housing side.
Figure 2:
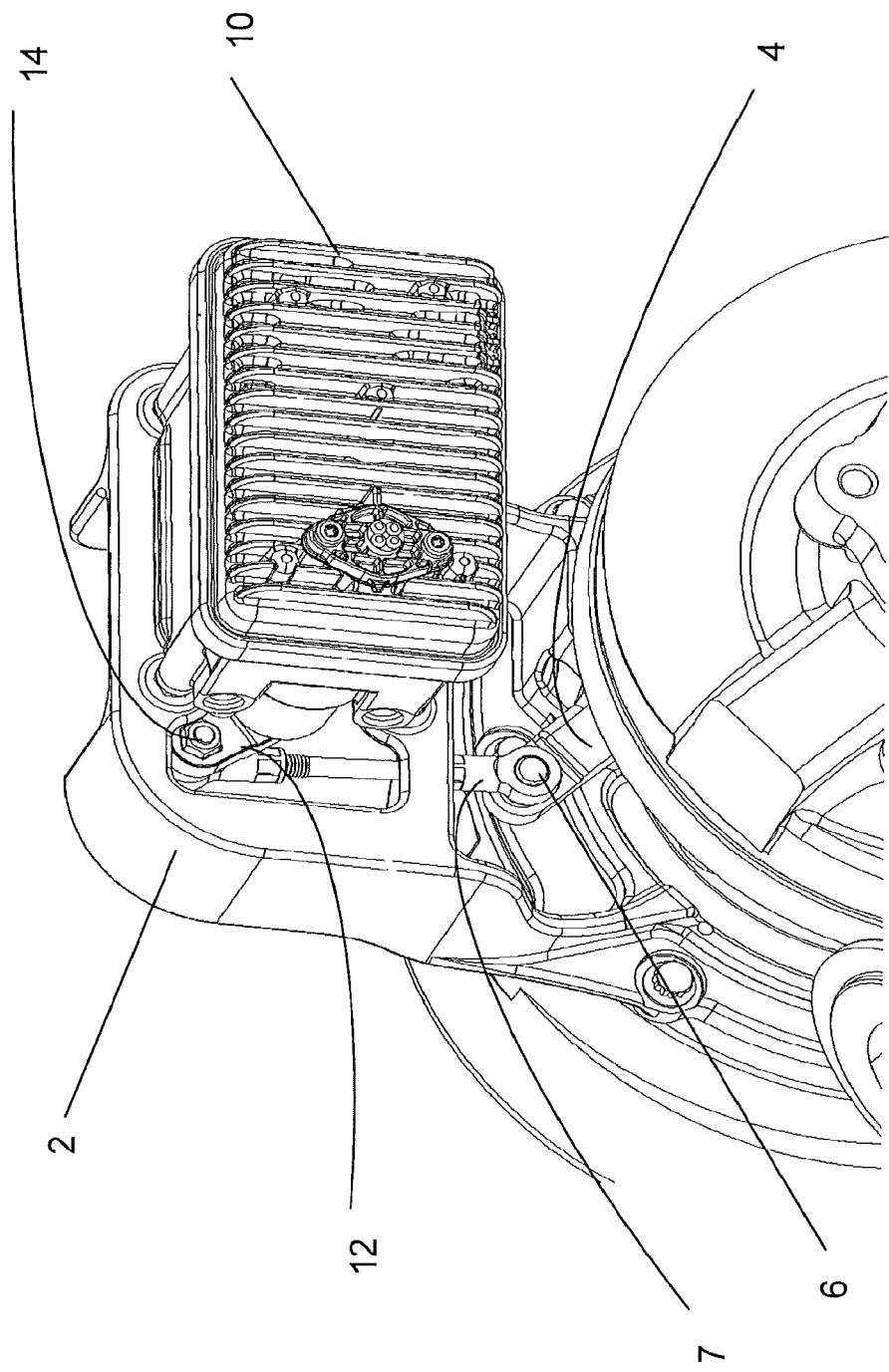
FIG. 2 depicts a turbine housing mounted actuator assembly from the compressor housing side.

The present invention was conceived while performing unrelated VTG testing. In running tests to determine the reactive loads that the VTG vane assembly exerts on the actuator when the actuator is commanded to alter the vane position, a load cell was inserted into the shaft (16) of a linkage. The inventors noticed that the data was inconsistent, even under controlled laboratory conditions. To investigate whether temperature might be to blame, a prototype linkage was made with a multitude of cooling fins and air was blown over the new linkage on the test stand. This did in fact solve the problem of inconsistent output from the load cell. During this test the inventors also noticed that there was a reduction of the internal temperature in the actuator.

The idea was expanded into a production viable solution for reducing the heat flow to the actuator internal components, and thus to protect and extend the life of electronic components, during real time on-road conditions. Testing had shown that temperatures in the range of 430° C. to 540° C. on the turbine housing surface resulted in temperatures of 150° C. to 160° C. at the driven pin (6) on the VTG end of the connecting link. A temperature of 150° C. at the driven pin (6) on the VTG driven arm (4) resulted in a temperature of 121.5° C. at the driving pin (14) on the actuator drive arm (12), with the standard linkage. Printed Circuit Boards (PCBs) used in a VTG actuator enclosure are not particularly tolerant of temperatures above 100° C. Accordingly, the objective of the invention was to reduce the thermal input into the actuator enclosure, and to realize this objective the inventors set a goal to reduce the temperature at the drive pin (14) on the actuator drive arm (12) to be reliably under 110° C., preferably under approximately 100° C., in real world conditions.

Because turbochargers run at very high speed (depending on size, in excess of 250,000 RPM) and exist on manifolds of engines, which vibrate and cause vibration in elements mounted on them in a manner inconsistent with long life of the components, the inventors sought also to improve the stiffness and damping capabilities of the actuator linkage to improve reliability and durability of the assembly.

These objectives were achieved by a turbocharger having an electronic actuator unit connected to a variable turbine geometry mechanism or wastegate (Not Shown) via an axially extending control linkage, wherein the control linkage is modified such that heat dissipation of the control linkage is significantly increased, or heat conductance along the control linkage to the actuator is substantially reduced, over that of the standard control linkage.

In the present invention, the diameter of the receiving bore (9) of the ball (8) in the rod-end (which is obviously the same diameter as drive pin (14)) can be used as a frame of reference since:

(a) the diameter of the threaded bore (25) in the barrel or neck of a female rod-end is typically equal to the diameter of the bore (9) in the ball (8), and the threaded bore (25) in a female rod-end is conventionally equal to the diameter of the shaft (16), b) the diameter of the bore (9) in the ball (8) in the actuator end of the control linkage is conventionally equal to the diameter of the bore (9) in the ball (8) on the VTG end of the control linkage, (c) the diameter of the bore (9) in the ball (8) correlates to contact surface area, since it will be filled with either a drive pin, bolt or stud, and is thus directly related to the heat conductance between the VTG driven arm (4) and the control linkage as well as between the control linkage and the actuator drive arm (12), (d) thermal energy transfer is related to the diameter of the conductor, e.g., shaft, and (e) conventionally all dimensions of features on rod-ends are scaled in tables referring back to the diameter of the diameter of the bore in the ball which receives the drive pin.

Figures 3, 4:
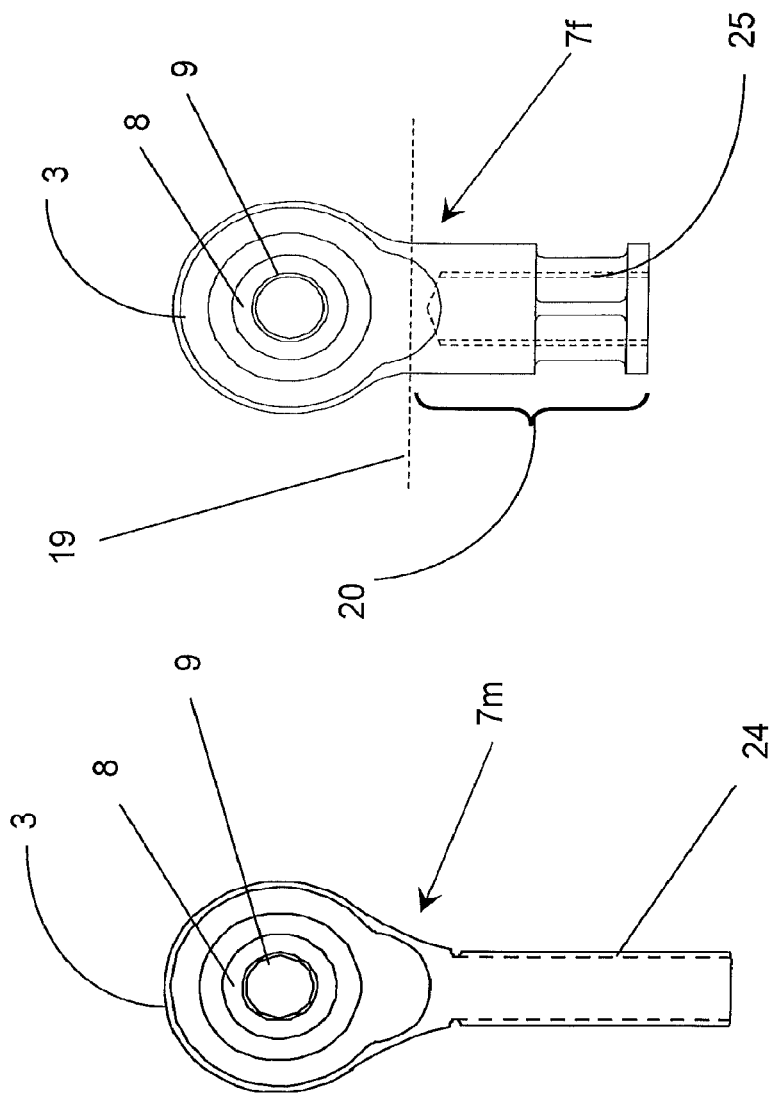
FIG. 3 depicts views of a typical male rod end.
FIG. 4 depicts views of a typical female male rod end.

FIGS. 3 and 4 depict standard designs for rod-ends of the type commonly in use on turbocharger linkages. The load capabilities for either the male rod end (7m), as seen in FIG. 3, or the female rod-end (7f), as seen in FIG. 4 are similar. For the purposes of this application, within the constraint of substitution that is mechanically possible, it is assumed that the rod-end could be either male (m) or female (f).

Conventionally, the rod ends of a control linkage are connected via an elongate solid metal cylinder referred to as a "shaft". In the present invention this connecting element, if present, may be substantially modified from the conventional shaft shape, thus the term "center section" shall be used in the following as a more general term to refer to the shaft section not including rod ends. Term "control linkage" shall refer to the assembly connecting the drive pin and driven pin, i.e., two rod ends and the center section.

For the embodiments of the present invention where the reduction in heat flow is accomplished by increasing surface area (rather than by use of materials with lower thermal conductivity), the increase in effective heat radiating surface area needed to reduce the temperature at the drive pin (14) on the actuator drive arm (12) to be reliably under 110° C., preferably under approximately 100° C., in real world conditions is about 1.4 times the surface area of a "baseline" control linkage. A "baseline" control linkage is a model control linkage constructed based on two essential dimensions (bore diameter and centerline length) taken from the inventive control linkage. The following examples will demonstrate how to calculate the effective heat radiating surface area of various control linkages, with Example 1 having a bore diameter 6 mm and centerline length 111.56 mm, and with Examples 2-5 all having the same bore diameter and centerline length, such that Example 1 is the "baseline control linkage" against which the modified effective heat radiating surface areas of control linkages with the same pin diameter and centerline length are compared.

Example 1

Calculating Effective Heat Radiating Surface Area of a Conventional Control Linkage This Example will serve to demonstrate how to calculate the effective heat radiating surface area of a conventional control linkage. The control linkage of Example 1 has a conventional design, and because it has the same two critical reference dimensions as the following inventive examples, i.e., (a) centerline length 111.56 mm and (b) bore diameter 6 mm, it will also be the "baseline" against which the inventive control linkages (Examples 2-5) will be compared.

Figure 6:
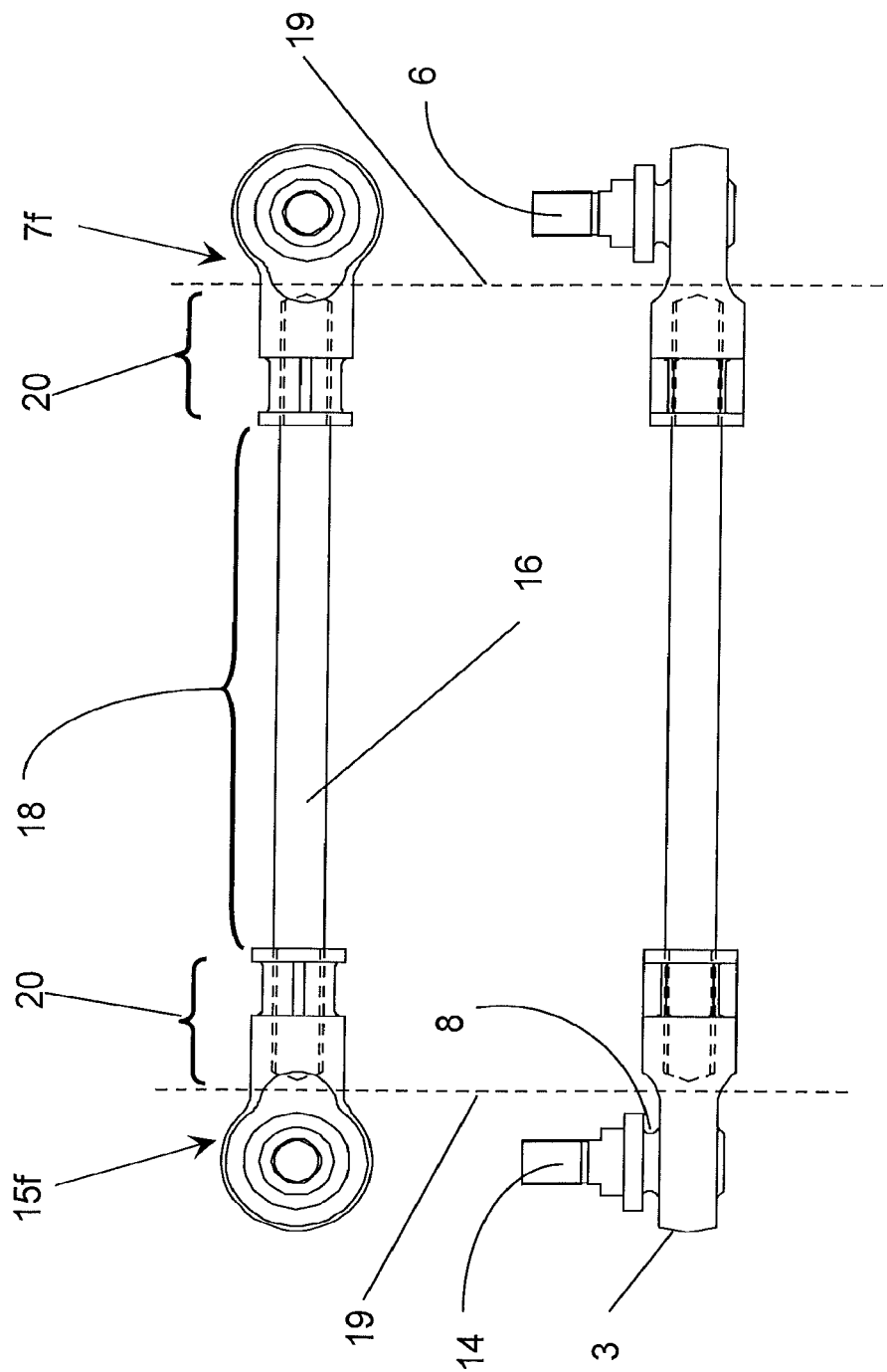
FIG. 6 depicts two views, the lower being a side elevation and the upper being a plan view, of a typical linkage comprising a shaft and two rod ends.

As can be seen from FIGS. 4 and 6, the female rod end (7f) is comprised of two main sections: (a) the cylindrical zone (20), or barrel, of the rod end, which houses the threaded bore (25), and (b) the head, which has a generally circular outer diameter and houses the ball (8). The ball is mounted in the head for rotation and swivel and has a bore (9) into which the drive pin or driven pin (6, 14) is inserted.

The head section (3) of the rod end, which is omitted from the surface area calculation, is separated from the substantially cylindrical barrel zone (20) of the rod end, of which the surface area is to be calculated, by a plane which shall be referred to as the "transition plane" (19). The transition plane extends perpendicular to the rod end centerline (longitudinal axis) and passes through the points where the substantially cylindrical barrel zone (20) first begins to transition to the shape of the generally circular outer diameter of the head (see FIG. 4).

The first critical reference dimension, centerline length (CL), is defined as the distance between the centers of the balls (8) in each of the rod ends (7f and 150, as the rod-ends are assembled to the shaft (16) to form a control linkage. In FIG. 6 the centerline distance is the distance from the center of the ball (8) in the driving rod-end (150 to the center of the ball in the driven rod-end (7f).

The second critical reference dimension, bore diameter, is the diameter of the bore (9) in the ball (8).

Typically rod-end dimensions are tabled to the bore diameter in the ball (i.e., drive or driven pin diameter). So, for example, the diameter of the cylindrical zone (20), or barrel, in FIGS. 4 and 6, (which houses the threaded bore (25)) in the female rod-end (7f)) for a typical 6 mm bore diameter rod-end is 11 mm, but for a 10 mm bore diameter rod-end (commonly referred to as a 10 mm rod-end), the diameter of the same barrel is 17 mm.

TABLE 1

Figure 14:
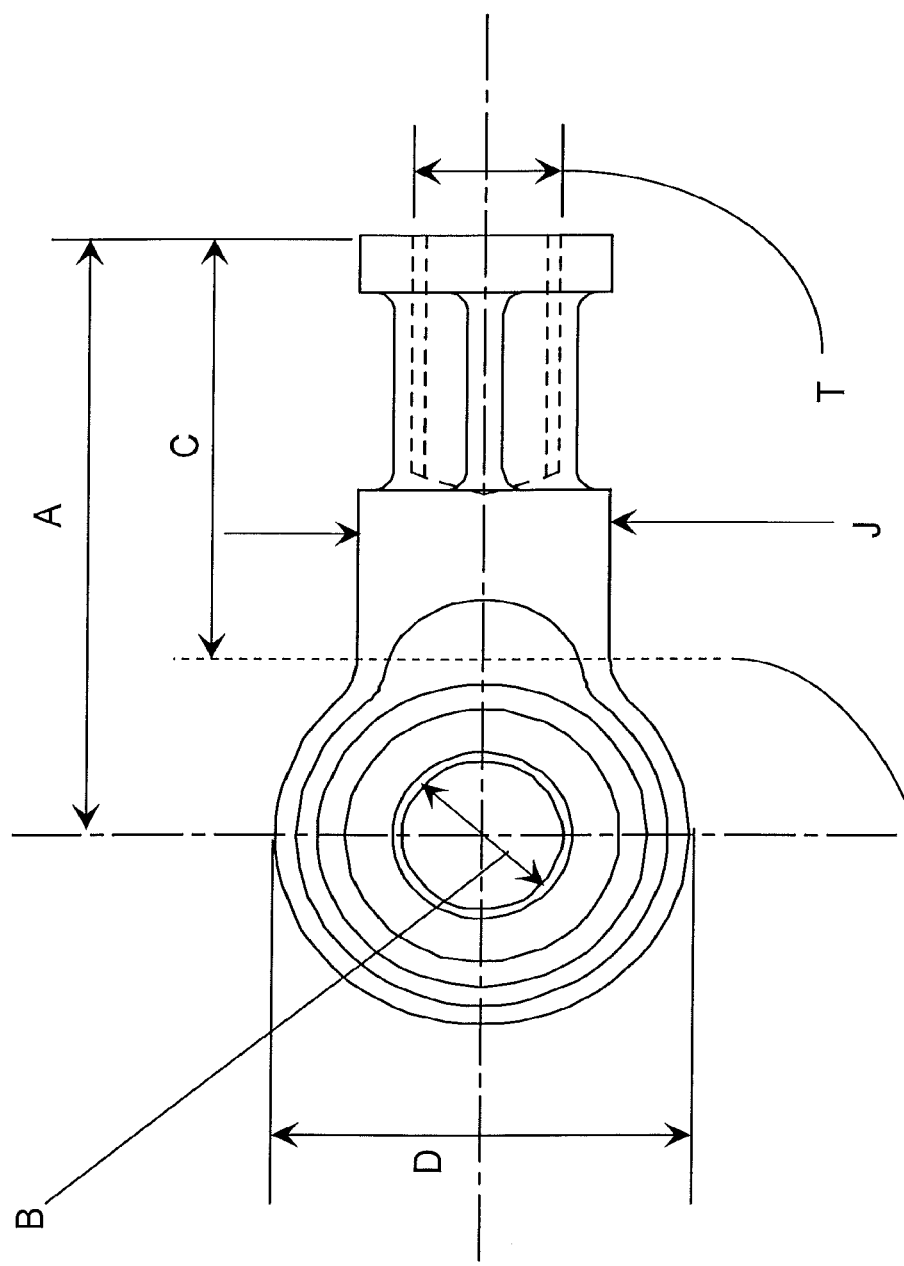
FIG. 14 depicts a view of a rod-end showing some dimensional features which are used in the model for the scaling of rod-ends

Relationship of ball bore (B) to barrel diameter (J) and axial length of barrel (C)(FIG. 14)

| Descriptor | Ball bore B | Length from end to centerline A | Calc. length from Transition plane to end C | Head Diameter D | Barrel diameter J |
|---|---|---|---|---|---|
| Rod end 5 | 5 | 27 | 18 | 18 | 9 |
| Rod end 6 | 6 | 30 | 20 | 20 | 11 |
| Rod end 8 | 8 | 36 | 25 | 24 | 14 |
| Rod end 10 | 10 | 43 | 30 | 28 | 17 |
| Rod end 12 | 12 | 50 | 35 | 32 | 19 |

TABLE 1-continued

Relationship of ball bore (B) to barrel diameter (J) and axial length of barrel (C)(FIG. 14)

| Descriptor | Ball bore B | Length from end to centerline A | Calc. length from Transition plane to end C | Head Diameter D | Barrel diameter J |
|---|---|---|---|---|---|
| Rod end 14 | 14 | 57 | 40 | 36 | 22 |
| Rod end 16 | 16 | 64 | 46 | 42 | 29 |
| Rod end 20 | 20 | 77 | 54 | 50 | 32 |

For a clear understanding of the geometric descriptors in the above table, FIG. 14 depicts the axial length of the substantially cylindrical barrel zone (C) for the female rod end as the distance from the transition plane (19) to the exposed threaded end of the rod-end, which for a typical 6 min bore diameter rod-end is 20 mm, as indicated on the Table. In the model or baseline control linkage, the diameter of the male shaft (24), or the diameter of the threaded bore (T), is the same as the diameter of the bore (B), which is of course the same as the diameter of the drive pin (6, 14) in the bore.

Thus, beginning with a centerline length and a bore diameter, it is possible to construct the entire standard or baseline control linkage.

The effective heat radiating surface area of the double female ended control linkage shown in FIG. 6 will now be calculated.

Note first that the shape of the "head" section of the rod end does not change substantially between standard and inventive embodiments, and furthermore does not contribute substantially to heat radiation, thus, for ease of calculation, the head section of the rod end can simply be ignored for purposes of the present invention. Accordingly, the head section of the rod end is omitted when calculating the "effective heat radiating surface area" of the control linkage.

Further note, as can be seen in FIG. 1, a rod end is conventionally fabricated with two flats or with a hexagonal feature for receiving a wrench. For ease of calculation, this feature can be ignored (and if ignored is ignored for both the baseline and inventive surface calculation), and the surface of the substantially cylindrical barrel section of the rod-end is simply extrapolated to extend longitudinally also over this area of reduced surface area.

Thus, the "effective heat radiating surface area" of the control linkage shown in FIG. 6 is comprised of the surface area of three zones—two substantially cylindrical zones (20) on the driving and driven rod ends, plus the exposed surface area zone (18) of the shaft (16). The effective heat radiating surface area is the surface area from transition plane (18) to transition plane (18).

The surface area of each substantially cylindrical zone (20) of the 6 mm diameter example female rod-end (7f) shown in FIG. 4 is 573 mm².

The exposed surface area of the shaft (16) at zone (18) as shown in FIG. 6 is 11.59 mm².

The sum of the surface areas of zone 20+zone 18+zone 20 in FIG. 6 is thus 2306 mm² Thus, the effective surface area of the "baseline" control linkage with bore diameter of 6 mm, female rod end barrel diameter of 11 mm, and centerline length of 111.56 mm is 2306 mm².

Surface area correlates with heat radiation. The greater the surface area, the greater the expected heat radiation. Thus, by comparing the effective surface area of modified control linkages to the effective surface area of the baseline control linkage, a good general approximation can be made of the relative heat dissipation ability.

$$R \frac{\text{Effective surface area of invention control linkage}}{\text{Effective surface area of baseline control linkage}}$$

The nature of the airflow over the cooling fins also contributes to the definition of the cooling fin design. If the air is of high velocity, then the air space between the fins must be of a design such that the boundary layer growth along the fins does not choke the airflow in the space between the fins. If the ambient airflow is of low velocity, then the airspace between the fins is of less importance and the surface area of the fins is of more importance.

Example 2

Calculating Surface Area of Control Linkage with Radial Fins on Rod Ends

In an embodiment having the inventive rod end (30), as depicted in FIG. 5, the substantially cylindrical outer surface zone (20) of the rod-end (7f), as depicted in FIG. 4, is substituted by a surface which encompasses a plurality of cooling fins (31). The centerline length remains 111.56 mm in the Examples to correspond to the "baseline" control linkage of Example 1. In general the plurality of cooling fins may be provided along at least one axial segment of said control linkage, or may extend along the entire axial length of the substantially cylindrical outer surface zone (32) of the rod-end (30). The cooling fins extend radially outwardly generally perpendicular to the axis of the control linkage, are axially spaced, and generally annular, whereby the effective surface of the control linkage is increased. For a typical 6 mm rod-end, the length of the substantially cylindrical section is lengthened according to the illustrated embodiment from 16.2 mm to 46 mm to allow for more cooling fins. This is depicted in FIG. 5 as zone (32). The female threaded bore (25) is located in the end opposite to the bore (9).

The clearance required around the shaft in order not to contact the casting bracket (2), actuator drive arm (12), or driven arm (4) may be different for each application. In the exemplary first embodiment of the invention, the drive arm (12) of the actuator has an offset joggle (not shown) to provide clearance around the rod end plus increased stiffness of the component. A like joggle can be seen on the driven arm (4) on the VTG-end of the linkage. In most applications the clearance to mating parts is over a short zone on each end, so the length of the cooling fins (31) may be different at different zones on the rod-end.

Figure 7:
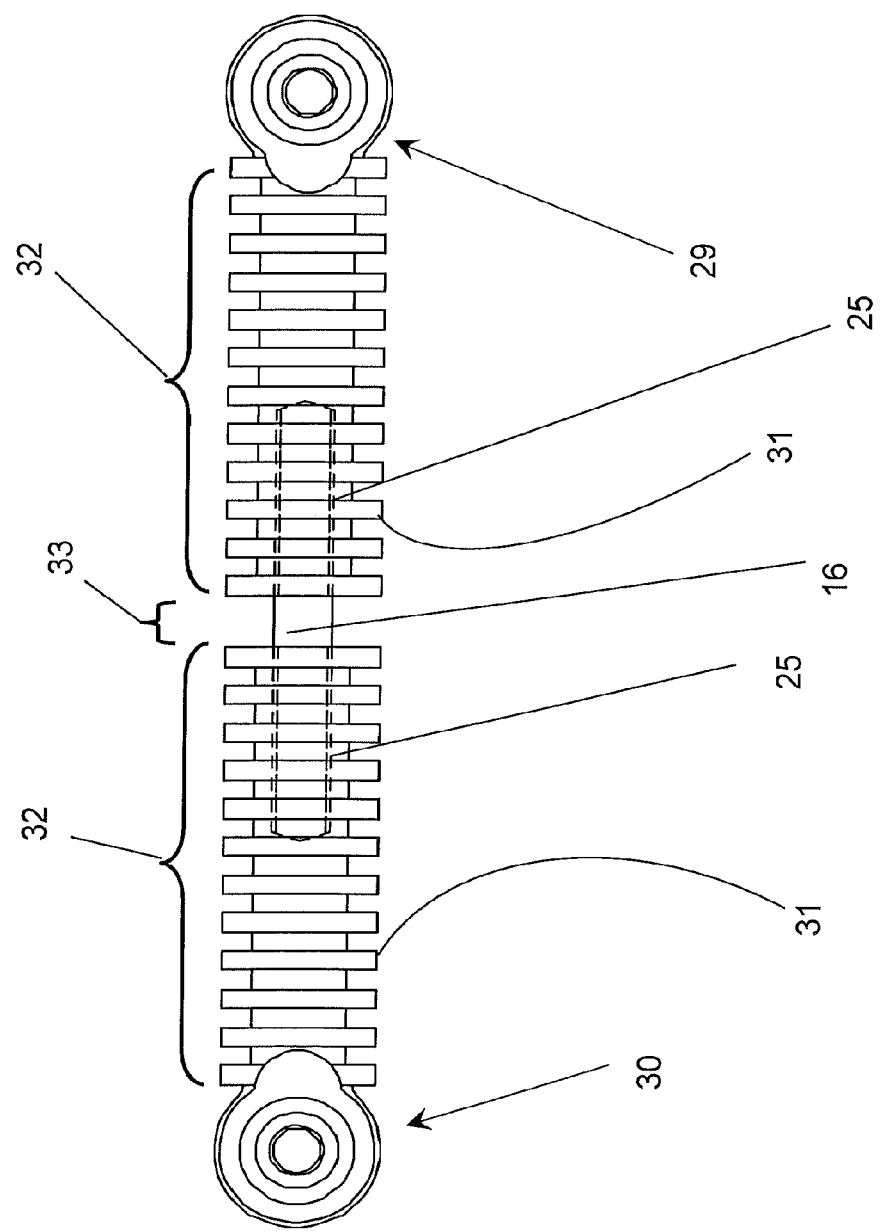
FIG. 7 depicts a view of a first embodiment of a control linkage according to the invention.

In the assembled control linkage as shown in FIG. 7, two finned rod-ends (29, 30) are coupled by a shaft (16) to make a control linkage. For this control linkage with 6 mm rod-end, the total effective surface area, which includes both zones 32 plus zone 33 is 9152 mm². The ratio of effective heat radiating surface area of Example 2 to effective heat radiating surface area of the baseline control linkage is 3.97.

In the finned embodiments, the ratio of effective heat radiating surface area of embodiments according to the invention to effective heat radiating surface area of the baseline control linkage is at least about 1.4, more preferably at least 2.0, most preferably at least 3.0.

The height of the cooling fins is not particularly limited, and is preferably from 50% to 100% of the diameter of the bore in the ball.

The design of the cooling fins requires a compromise among the clearance required around the shaft which contributes to the maximum diameter allowable for each application, the cost of the base material from which the fins are cut, the nature of the airflow around the shaft, and the structural limitations of the material from which the fins are fabricated.

The cost of the material is an important factor in such a cost-conscious marketplace. If the rod end is cast, then the fins can be a larger diameter than the diameter of the head of the rod end. If the raw material for the rod-end is forged, then cost of the forging tool and the material becomes a constraining issue.

Example 3

Calculating Surface Area of Control Linkage with Hollow Shaft

Figure 8:
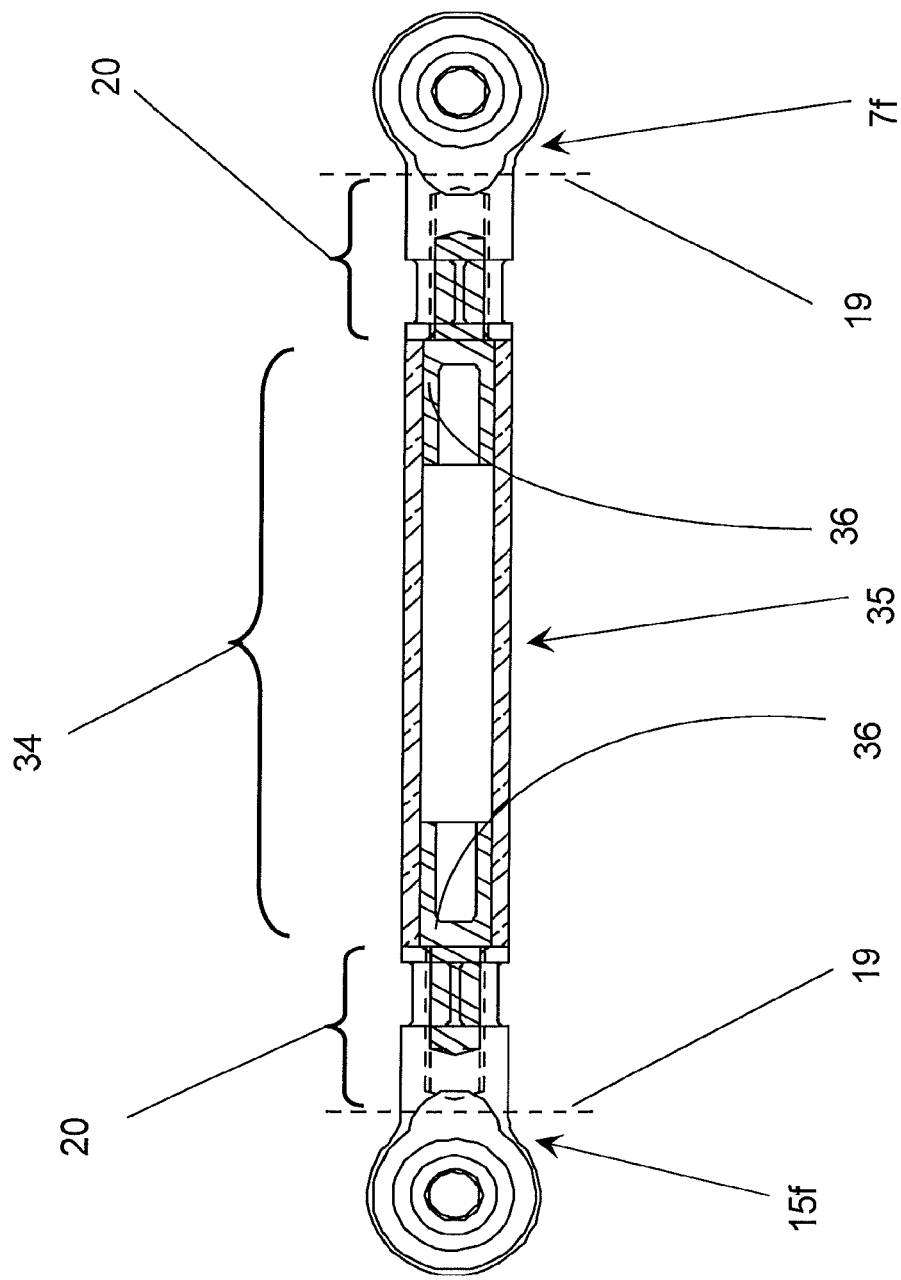
FIG. 8 depicts a view of a second embodiment of a control linkage according to the invention.

In a second embodiment of the control linkage of the invention, as depicted in FIG. 8, the reduction in heat transfer and/or increase in heat radiation is accomplished by using a hollow tubular center section instead of the conventional solid shaft. End couplers (36) are fixed to each end of a hollow substantially cylindrical tube (35) to enable standard female rod-ends (7f) to be mounted on threaded male protrusions (39) of the end couplers (36). In this embodiment the surface area of the tube is preferably nearly double that of the shaft, i.e., the outer diameter of the tube in example 3 is the same diameter as the substantially cylindrical barrel of the baseline rod-end which is 11 mm (compare FIGS. 6 and 8).

From a heat conduction standpoint, since the heat conduction of a body is a function of the mass of material in the body, and the length of a solid shaft and the length of a tube are substantially the same, assuming for a first case that the mass of the material is the same, then the conduction of heat along the center section can be expressed in terms of cross sectional area. The cross sectional area of a solid shaft of 6 mm diameter is 28.3 mm$^2$ The cross sectional area of an 11 mm tube, with a wall thickness of 1.5 mm is 44.7 mm$^2$. However the surface area of the 11 mm tube is 2121.8 mm$^2$. the surface area of the 6 mm solid shaft is 1159 mm$^2$. Since the core of the tube is hollow, it is filled with air, which is a poor heat conductor compared to a metal such as steel. Thus, with this embodiment, heat dissipation is greater due to the greater surface area, and heat conductance is effectively reduced due to the hollow core, despite the cross sectional area of the 11 mm tube being 47% greater than that of the 6 mm solid shaft. More preferably however, as a second case the solid shaft would be replaced by a hollow tube of the same diameter, in which case the cross sectional area clearly becomes the dominant feature.

In the control linkage of the invention as shown in FIG. 8, for a typical 6 mm rod-end, the total effective surface area, which includes both zones 20 plus zone 34 is 3268 mm$^2$ The ratio of effective heat radiating surface area of Example 3 to effective heat radiating surface area of the baseline control linkage is 1.42.

In the hollow shaft embodiments, this ratio is preferably at least 1.3, more preferably at least 1.4, and most preferably at least 1.8.

Example 4

Calculating Surface Area of Control Linkage with Radial Fins on Shaft

In a third embodiment of the control linkage of the invention, as depicted in FIG. 9, the linkage consists of two standard female rod-ends (7f and 15f) coupled to a center section (42). The center section (42) is substantially cylindrical with a plurality of fins (31) fabricated into the outer surface of the center section. Threaded axial male protrusions (39) are provided on the ends of the center section (42) so that standard female rod-ends (7f, 15f) may be attached. For a typical 6 mm rod-end, the total effective heat radiating surface area, which includes both zones 20 plus zone 43 is 6801 mm$^2$. The ratio of effective heat radiating surface area of Example 4 to effective heat radiating surface area of the baseline control linkage is 2.95.

On-engine testing, using a linkage represented by the third embodiment of the control linkage of the invention, a temperature on the actuator drive arm (12) of 85° C. was measured, with a VTG driven arm (4) temperature of 158° C. In the same test sequence the temperature on the actuator drive arm (12) was 121.5° C. with the standard linkage represented in FIG. 6. Thus, the third embodiment resulted in a measured temperature at the drive pin (14) on the actuator drive arm (12) 15° C. below the target temperature of approximately 100° C., while the standard linkage under the same conditions produced a temperature which exceeded the target temperature by 21.5° C.

In a first variation to the third embodiment of the control linkage of the invention, instead of fins (31) with sharp right-angled corners joining the fin surfaces to the inner and outer diameters, the surfaces joining adjacent fins (50) are curved or wave shaped; and the fin's surfaces, instead of joining the shaft part perpendicular to the link centerline, may be at an angle to the centerline, forming peaks and valleys as depicted in FIG. 10. The ratio of effective heat radiating surface area of the first variation of the third embodiment of the control linkage of the invention to the effective heat radiating surface area of the baseline control linkage is only slightly less than that of the third embodiment as shown in FIG. 9.

In a second variation to the third embodiment of the invention, a shown in FIG. 11, the center section (49) is constructed in a manner similar to that of the exemplary third embodiment of the invention, with the difference being that the center section (49) is longer to allow more fins (31) on the outside of the substantially cylindrical part of the shaft. In this variation, the rod-ends may be male rod ends (7m), which are threaded into female threads (25), located in the ends of the center section (50). For a typical 6 mm rod-end, the total standardized surface area, which includes only zone 51 is 8671 mm$^2$. This embodiment is compared against the baseline control linkage with two female rod ends, and it is determined that the ratio of effective heat radiating surface area of the second variation of the third embodiment of the control linkage of the invention to the effective heat radiating surface area of the baseline control linkage is 3.8.

In a third variation to the third embodiment of the invention, as shown in FIG. 12, the center section (53) is constructed in a manner similar to that of the exemplary third embodiment of the invention, with the difference being that the center section (53) is fabricated such that the diameter of the core part of the shaft between the fins is smaller than that of the exemplary third embodiment of the invention (FIG. 9). While the outside diameter of the fins of this variation is the same as that of the exemplary third embodiment of the invention, the inside diameter of the fins is smaller, thus the fin (54) is longer or "taller". In order to achieve this geometry, threaded male protrusions (39) are provided on the ends of the shaft (53) so that standard female rod-ends (7f) may be attached. For a typical 6 mm rod-end, the total effective heat radiating surface area, which includes both zones 20 plus zone 52, is 7880 mm² The ratio of effective heat radiating surface area of third variation to the third embodiment to the effective heat radiating surface area of the baseline control linkage is 3.42.

Example 5

Calculating Surface Area of Control Linkage with Longitudinal Fins on Shaft

Figure 13:
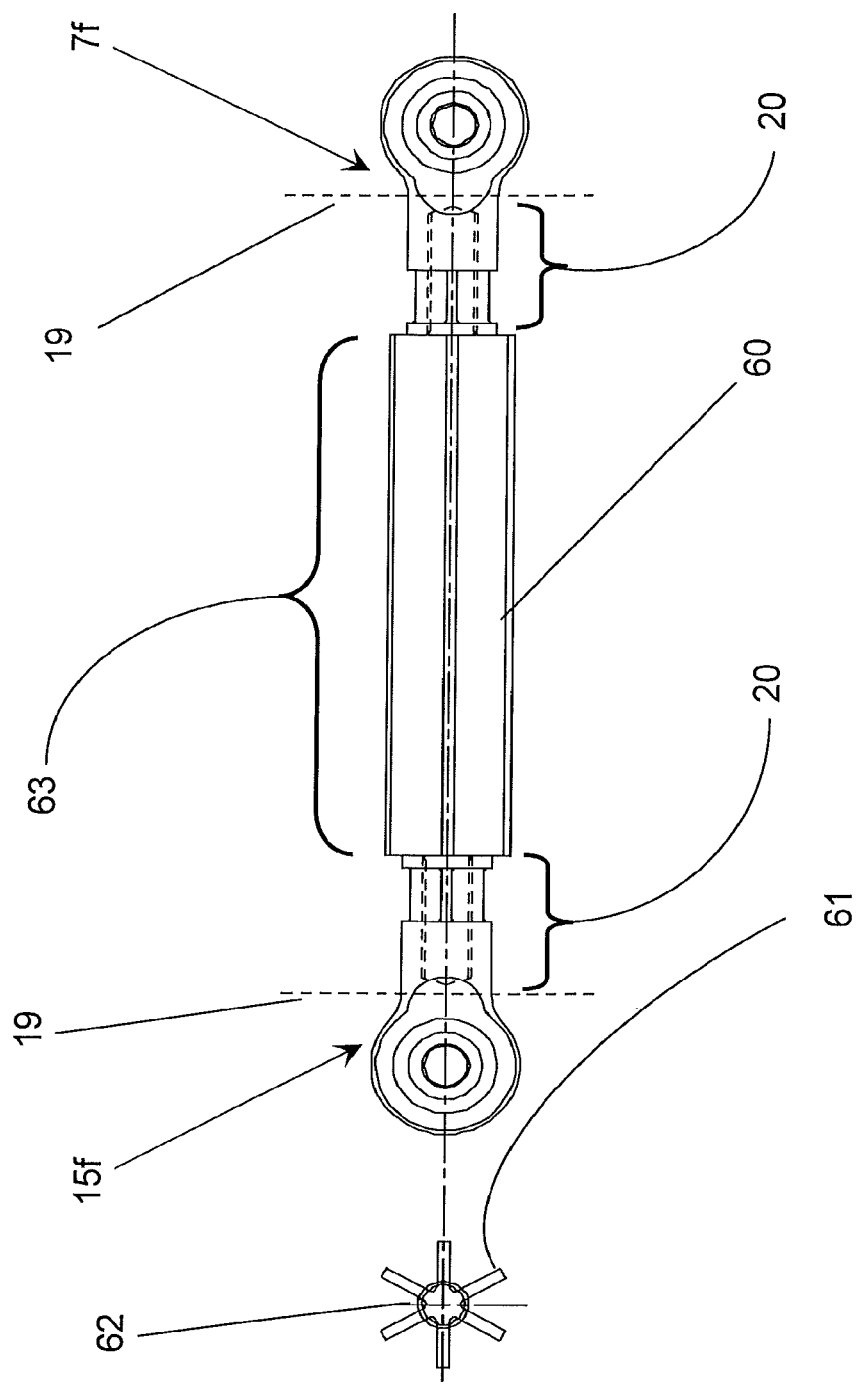
FIG. 13 depicts a view of a fourth embodiment of a control linkage according to the invention.

In a fourth embodiment of the invention, as depicted in FIG. 13, the linkage consists of two standard rod-ends (70 coupled to a center part (60). The center part (60) includes a series of longitudinal (i.e., axial) fins (61), fitted to a common spine (62), to which are attached threaded male protrusions (39) so that standard female rod-ends (70 may be attached. For a typical 6 mm rod-end, the total standardized surface area, which includes both zones 20, plus zone 63 is 5872 mm². The ratio of effective heat radiating surface area of Example 5 to effective heat radiating surface area of the baseline control linkage is 2.55.

In the exemplary fourth embodiment of the invention, there are 6 fins. However, the number of fins is not critical If the number of fins is increased from 6 to 8, then the surface area increases from 5872 mm² to 7398 mm²; an increase of 26%. As discussed above, the proximity of adjacent fins is a function of the nature of the airflow around the fins and the fin count should be tailored to the ambient airflow.

Further, the longitudinal fins preferably extend over at least one quarter of the centerline length of the control linkage, more preferably over at least one half of the centerline length of the control linkage.

Example 6

Calculating Heat Transfer of Low Thermal Conductivity Linkage

In yet another embodiment, the reduction in heat transfer is accomplished by forming the shaft or rod-ends of a material with a lower thermal conductivity than the steels conventionally used for control linkages.

As mentioned above, the material from which the linkage is fabricated can play a role in the thermal flow of heat through the thermal conductivity (k) property of the material. The thermal conductivity of some materials which could be used for linkages is:

| Material | Thermal Conductivity (W/(m*K)) |
|---|---|
| SAE 4130 Steel | 42.7 |
| SS 316 | 16.3 |
| Ti 6 Al4 V | 7.2 |
| PEEK | .25 to .92 |

Analysis of the materials used in the baseline linkage produced the following data:

With an input temperature of 150° C. at the VTG end of the linkage the temperature at the Actuator end of the linkage for different materials is:

| Material | Thermal Conductivity (W/(m*K)) | Temperature at Actuator end ° C. |
|---|---|---|
| SAE 4130 Steel | 42.7 | 137.3 |
| SS 316 | 16.3 | 121.5 |
| Ti 6 Al4 V | 7.2 | 100.7 |
| PEEK | .25 to .92 | 52.2 |

So it can be seen that by replacing materials of higher coefficients of thermal conductivity with materials of lower coefficients of thermal conductivity, a linkage of the same mechanical design can produce greater temperature gradients, and thus provide more temperature margin for the thermally sensitive internal components in the actuator. It was assumed in the calculations that the rod-end bearing material (the material supporting the ball (8) in the head (3)) was PEEK, which has a low thermal conductivity when compared to the other widely used materials for the linkage.

While the exemplified materials can cause large reductions in temperature, only Ti6Al4V was sufficient to reliably suppress the temperature to the range of approximately 110° or less, preferably 100° C. or less, on the actuator end of the linkage.

Because the linkage and rod-ends are situated in close proximity to a relatively high temperature thermal source, the turbine housing, the materials from which the linkage components are manufactured must be capable of providing appropriate strength at operating temperatures.

Comparative Example 1

Calculating Surface Area of Control Linkage with Long Shaft Linkage

A control linkage is made having the same bore diameter 6 mm as Example 1. However, the centerline length is extended to 200 mm.

Since the centerline length is a "critical reference value", the centerline length of the baseline model against which it is compared is also extended to 200 mm.

The diameter of the cylindrical zone (20) remains 11 mm and the axial length of the cylindrical zone (20) remains 20.38. While the surface area of the comparative long shaft linkage (numerator) is approximately double that of Example 1, the centerline length of the baseline control linkage (denominator) is increased by the same amount, thus the ratio according to the following formula is 1.0.

$$\text{Ratio} = \frac{\text{Effective surface area of comparison control linkage}}{\text{Effective surface area of baseline control linkage}}$$

Comparative Example 2

Calculating Surface Area of Control Linkage with Thick Shaft Linkage

A control linkage is made having the same centerline length as Example 1. However, bore diameter is increased to 10 mm, and the diameter of the barrel is 17 mm. The axial length of the barrel is however unchanged from Example 1 at 20.38.

Since the bore diameter is a "critical reference value", the bore diameter of the baseline model against which it is compared is also increased to 10 mm. The diameter of the barrel in the cylindrical zone (20) of the baseline linkage is determined by going to Table 1. For the 10 mm bore diameter, the diameter of the barrel is 17 mm. According to Table 1, the axial length of the barrel is unchanged from Example 1.

Since the bore diameter and centerline length of the baseline model is the same as that of Comparative Example 8, the total effective surface area would also be the same, thus the ratio according to the above formula would be 1.0.

Comparative Example 3

Calculating Surface Area of Control Linkage with Two Male Ends

A control linkage is made having the same centerline length and shaft diameter as Example 1. However, instead of female rod ends as shown in FIGS. 4 and 6, two male rod ends are employed (similar to the embodiment shown in FIG. 11). The control linkage of Comparative Example 3 differs from Example 1, FIG. 6, in that the axial length of the barrel in the cylindrical zone (20) is almost non-existent, the center section is lengthened to compensate, and the center section diameter is greater to allow for a threaded bore to receive the threads of the male rod ends (7m).

The baseline model control linkage is however constructed with two female ends and, since the critical reference values are the same as with Example 1, the baseline or reference effective thermal radiating surface area is thus identical with Example 1. The driving feature of the present invention is that the surface area of the inventive control linkage should be increased to the point that the actuator is insulated from the high temperature at the driven arm pin, i.e., the surface area of the control linkage should be increased such that heat dissipation results in a temperature at the drive pin not exceeding 110° C., preferably not exceeding 100° C. Of course, it is possible to have alternative rules on how to compute baseline control linkage. For example, a model could be used wherein the rod-end configuration of the model control linkage (e.g., male, female, axial length, etc.) is the same as the rod end configuration of the inventive linkage. Further yet, the baseline could simply be based on the formula "CL×bore diameter×π×fudge factor (for increase in surface area at barrel). For simplicity, the one general rule for computing baseline as explained above is used.

Since the shaft of Comparative Example 3 is of greater diameter than the shaft of Example 1, the total effective surface area of Comparative Example 3 is greater than that of the baseline surface area, giving a ratio of approximately 1.2.

Comparative Example 4

Calculating Surface Area of Control Linkage with One Male End and One Female End A control linkage is made having the same centerline length and bore diameter as Example 1. However, instead of two female rod ends as shown in FIG. 6, one female rod end is made with an elongate barrel such that a male rod-end, as shown in FIG. 3 is threaded into the bore of the elongated barrel of the female rod-end. The centerline length of the comparative control linkage (ball to ball distance), for this example is maintained at 111.56 mm.

The control linkage of Comparative Example 4 differs from Example 1, FIG. 6, in that the axial length of the barrel in the cylindrical zone (20) of FIG. 6 is replaced by longer zone 32 of FIG. 7 of the female rod end which replaces the shaft, and the axial length of the barrel of the male rod end is almost non-existent. The added heat rejection zone becomes the surfaces of the extended zone 32.

The baseline model control linkage as reference for comparison is however again constructed with two female ends and, since the critical reference values are the same as with Example 1, the baseline or reference effective thermal radiating surface area is thus identical with Example 1.

Since the "center section" of Comparative Example 4 does not exist but the effective change is in the axial length of the elongated barrel zone, the total effective surface area of Comparative Example 4 is greater than that of the baseline surface area by a factor of about 6.2.

Comparative Example 5

Calculating Surface Area of Control Linkage with Different Rod-End Ball Bore Diameters A control linkage is made having the same centerline length as Example 1. However, instead of two identical female rod ends, one female rod end has a ball with a bore of 6 mm, the other female rod end has a ball with a bore diameter of 8 mm.

n the case that the inventive control linkage has rod ends of different sizes, then the baseline configuration will have a center section with a shaft of a diameter equal to the diameter of the bore in the ball of the smaller rod-end.

Thus, the baseline model control linkage as reference for comparison is constructed with two female ends with balls with 6 mm bore diameter. Since the critical reference values are thus the same as with Example 1, the baseline or reference effective thermal radiating surface area is thus identical with Example 1.

The shaft of the center section of Comparative Example 5 is made with the same diameter as the bore in the ball of the smallest rod-end (6 mm). Only the barrel of the female rod end has a ball with a bore diameter of 8 mm differs in that it is 14 mm, not 11 mm. The total effective surface area of Comparative Example 5 is thus greater than that of the baseline surface area, giving a ratio of approximately 2.23.

Now that the invention has been described, I claim:

1. A turbocharger including an electric actuator unit connected internally within a turbocharger housing (1) connected to a variable turbine geometry mechanism via an axially extending control linkage,
    wherein the axially extending control linkage includes a shaft and a rod end, and wherein at least one of the shaft and the rod ends is provided with a plurality of cooling fins along at least one axial segment thereof cooling fins.

2. The turbocharger as in claim 1, wherein said cooling fins are axially spaced radially outwardly projecting cooling fins extending generally perpendicular to the axis of the linkage.

3. The turbocharger as in claim 2, wherein said cooling fins are generally annular cooling fins.

4. The turbocharger as in claim 1, wherein said cooling fins are longitudinally extending fins extending parallel to the longitudinal axis of the control linkage.

5. The turbocharger as in claim 1, wherein said control linkage comprises a center section having first and second ends and one rod end respectively connected to each center section end via a threaded connection, wherein said cooling fins are provided on both rod ends.

6. The turbocharger as in claim 1, wherein said control linkage comprises a center section having first and second ends and one rod-end respectively connected to each center section end via a threaded connection, wherein said cooling fins are provided on said center section.

7. A turbocharger including an electric actuator unit connected internally within a turbocharger housing (1) connected to a variable turbine geometry mechanism via an axially extending control linkage,
   wherein the axially extending control linkage includes a shaft and a rod end, and
   wherein at least one of the shaft and the rod ends is provided with at least one hollow segment having a plurality of cooling fins.

8. The turbocharger of claim 7, wherein said control linkage is formed of a material having a thermal conductivity of not more than 7.2 (W/(m*K)).

9. A turbocharger including:
   a turbocharger housing (1);
   an electric actuator unit (10) attached to the turbocharger housing (1), the electric actuator unit (10) including an actuator drive arm (12);
   at least one of a variable turbine-geometry mechanism;
       a control linkage including a drive-end rod end (15) and a driven-end rod end (7) connected directly to each other or connected via an intermediate center section, each rod end (15, 7) including a cylindrical section (20) and a head section (3) divided by a transition plane (19), with a ball (8) constrained but free to rotate in the head (3), wherein each ball includes a bore (9);
       a drive pin (14) extending from the actuator shaft (11) into the bore (9) in the ball (8) in the drive-end rod end (15);
       a driven pin (6) extending from the bore (9) in the ball (8) in the driven-end rod end (7) and connected for driving the variable turbine geometry mechanism;
       wherein a surface area of the control linkage between the transition planes (19) is at least 1.4 times that of a baseline surface area;
       wherein the baseline surface area is calculated using a model control linkage;
       wherein the model control linkage comprises a drive-end rod end (15) and a driven-end rod end (7), the rod ends connected via a shaft (16), each rod end (15, 7) including a cylindrical section (20) and the head section (3) divided by a transition plane (19), with a ball (8) constrained but free to rotate in the head section (3), wherein each ball includes a bore (9);
       wherein the model control linkage has the same centerline length as the control linkage, wherein the centerline length is the distance from the center of the ball (8) of the drive-end rod end (15) to the center of the ball (8) of the driven-end rod end (7);
       wherein a diameter of the shaft of the model control linkage is the same as a diameter of the bore (9) of the control linkage;
       wherein the lengths and diameter of the cylindrical sections (20) of the rod ends of the model control linkage are determined as follows:

| Descriptor | Ball bore B | Length from end to centerline A | Calc. length from Transition plane to end C | Head Diameter D | Barrel diameter J |
|---|---|---|---|---|---|
| Rod end 5 | 5 | 27 | 18 | 18 | 9 |
| Rod end 6 | 6 | 30 | 20 | 20 | 11 |
| Rod end 8 | 8 | 36 | 25 | 24 | 14 |
| Rod end 10 | 10 | 43 | 30 | 28 | 17 |
| Rod end 12 | 12 | 50 | 35 | 32 | 19 |
| Rod end 14 | 14 | 57 | 40 | 36 | 22 |
| Rod end 16 | 16 | 64 | 46 | 42 | 29 |
| Rod end 20 | 20 | 77 | 54 | 50 | 32 | and
   wherein the surface area of the model control linkage is measured between the transition planes (19).

10. The turbocharger as in claim 9, wherein a flat or hexagonal wrench-receiving feature are is ignored in computing an effective heat radiating surface area of the control linkage and model control linkage.

11. The turbocharger as in claim 9, wherein the surface area of the control linkage between the transition planes (19) is at least 1.40 times that of a baseline surface area.

12. The turbocharger as in claim 9, wherein the surface area of the control linkage between the transition planes (19) is at least 2.0 times that of a baseline surface area.

13. The turbocharger as in claim 9, wherein the surface area of the control linkage between the transition planes (19) is at least 3.0 times that of a baseline surface area.

* * * * *